July 27, 1926.
H. F. HEINEMAN
EXPANSION JOINT FOR HEAT EXCHANGE APPARATUS
Filed Sept. 10, 1923
1,594,199
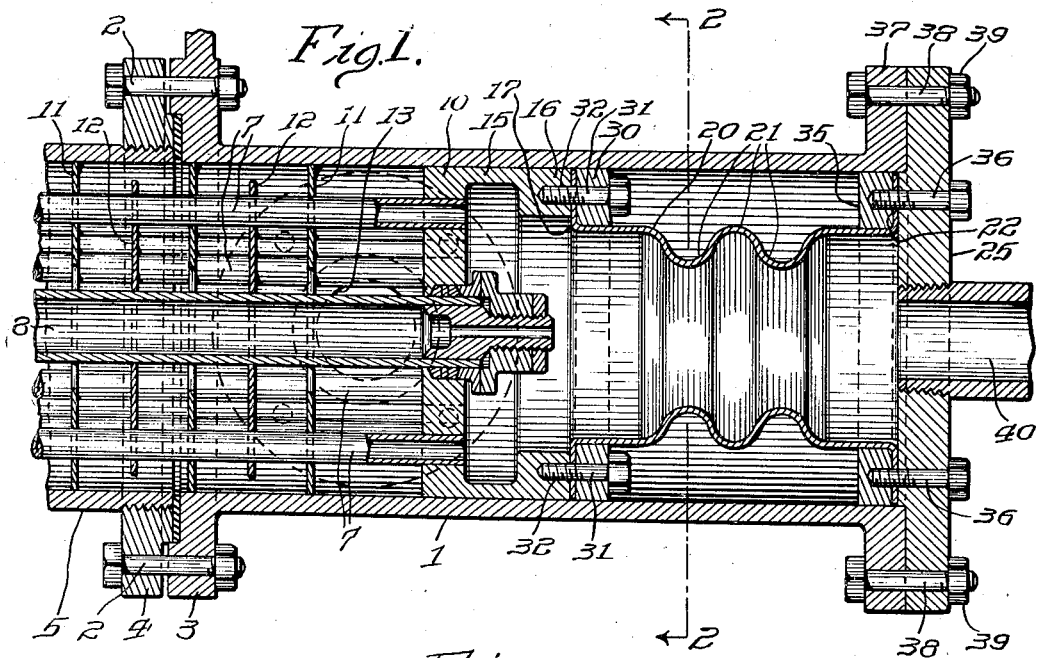

Patented July 27, 1926.

1,594,199

UNITED STATES PATENT OFFICE.

HENRY F. HEINEMAN, OF RIDLEY PARK, PENNSYLVANIA, ASSIGNOR TO SCHUTTE AND KOERTING COMPANY, OF PHILADELPHIA, PENNSYLVANIA, A CORPORATION OF PENNSYLVANIA.

EXPANSION JOINT FOR HEAT-EXCHANGE APPARATUS.

Application filed September 10, 1923. Serial No. 661,767.

In the case of heat exchange apparatus comprising a bundle of tubes the opposite ends of which are secured in openings in tube sheets or plates, which tubes and plates are situated within a cylinder, it is necessary that one of the said sheets shall be movable with respect to the cylinder; that is, that the joint between the said sheet and cylinder shall be expansible in order that linear expansion of the tubes may be provided for. Manufacturers of such apparatus have met with some difficulty in preventing leakage at the joint between the tube sheet and the cylinder walls, particularly in cases wherein the oil or other fluid which is being cooled is of a temperature much in excess of one hundred and fifty degrees Fahrenheit. Hence it is one of the objects of the persent invention to provide a novel construction of expansible joint in heat exchange apparatus of such character that leakage from one part of the apparatus to another is prevented.

A further object of the invention is to provide a novel construction of expansible joint which is simple and which is efficient for the purpose for which it is designed and intended.

To these and other ends my invention comprehends the construction as hereinafter described and claimed and as illustrated in the accompanying drawing in which one convenient form of embodiment of the invention is shown. However, it will be understood that changes in the details of construction may be made within the scope of the claims without departing from the said invention.

In the drawing:

Fig. 1 is a view in central longitudinal section of a portion of heat exchange apparatus comprising an expansible joint construction embodying my invention; and Fig. 2 is a transverse sectional view taken on the line 2—2 of Fig. 1.

In the drawing I have illustrated only that portion of the heat exchange apparatus which comprises the expansible joint construction which embodies the invention, and it will be understood that the remaining portion of the apparatus may be of any known construction desired.

Referring to the drawing: 1 designates a portion of the cylinder or casing of a heat exchange apparatus which, in the construction shown, is detachably connected by means of bolts 2 and flanges 3 and 4 to an intermediate portion of cylinder 5. However, it will be understood that if desired the cylinder may consist of a single member instead of a plurality of parts or sections as indicated. A plurality of tubes or pipes 7 and 8 are situated within the cylinder. The tubes or pipes 7, in the construction shown, are of less diameter than the pipe 8 which is concentrically situated with respect to said tubes 7. The opposite ends of the tubes 7 are secured permanently in openings in tube sheets or plates, only one of which 10 is shown in the drawing, while the concentrically situated tube 8 is detachably secured within the said tube sheets. It will be understood that the manner or form of connection of the tubes to the tube sheets does not in any way affect the invention.

The tubes 7 extend through and closely fit openings in annular baffle plates 11 which are located at intervals with respect to each other and the outer or peripheral edges of which closely fit the interior of the cylinder composed, in the construction shown, of the sections 1 and 5. The central openings through these plates are of a diameter considerably greater than the diameter of the central tube 8, as shown. Baffle plates 12 are arranged alternately with respect to the baffle plates 11. The said plates 12 are provided with openings through which the tubes 7 and 8 extend, the said tubes closely fitting the said openings. The diameter of the plate 12 is less than the interior diameter of the cylinder so that an annular space is provided between the outer or peripheral edges of the said plates and the said cylinder. The construction and arrangement of these plates is well known and it is also well known that one of the fluids,—say oil which is being cooled, enters the cylinder near one end thereof and flows through the said cylinder at right angles to the pipes 7 and 8 in the spaces between the baffle plates 11 and 12 and around the inner edges of the plates 11 and around the outer edges of the plates 12. The said fluid is discharged from the cylinder adjacent the opposite end from that of its introduction into the said cylinder. In the drawing it will be assumed that the port indicated at 13 is an inlet port for the oil or other fluid to be cooled. The cooling liquid flows through the tubes 7 and 8 and it having been assumed that the oil is introduced into the cylinder through the port 13 it follows that the counter-flowing or counter-current of cooling fluid should be introduced into the tubes 7 and 8 at the opposite end and should be discharged from the ends thereof illustrated in Fig. 1 of the drawing.

One of the tube sheets should be movable longitudinally of the cylinder so as to provide for the linear expansion of the tubes. The tube sheet 10 shown is movable and is provided with an outwardly extending flange 15 which closely fits the cylinder and terminates in an enlarged rim-like portion 16 upon which is seated the outwardly extending annular flange 17 which is formed upon the inner end of a tubular member or section 20 of relatively thin sheet metal which is provided with annular corrugations extending around the same, as indicated at 21. The opposite outer end of the said member 20 is provided with a similar flange 22 which is seated against the inner surface of the cover or head 25 of the cylinder. An annular washer-like clamping and holding member 30 is situated within the cylinder section 1 against the outer side of the flange 17 and is clamped against the latter by means of screw bolts 31 which extend through openings situated at intervals in the said annular washer-like member 30 and engage correspondingly situated screw threaded openings 32 in the enlarged rim portion 16 previously referred to. It will be seen that the member 30 is rigidly secured to the flange 15 of the tube sheet or plate 10 and that the exterior or peripheral surfaces of the said tube sheet, flange and washer-like member fit closely against the interior surface of the cylinder section 1. These parts taken together constitute in effect a piston which operates within the said cylinder.

An annular washer-like clamping and holding member 35 is situated within the outer end portion of the cylinder section 1 and in contact with the inner side of the flange 22 previously referred to and is clamped against the latter by means of screw bolts 36 which extend through openings arranged at intervals within the cover plate or head 25. The inner end portions of these screw bolts extend through the flange 22 and engage screw threaded openings within the washer-like members 35 and operate to draw the latter closely and firmly against the said flange 22 to clamp and hold the latter tightly against the said cover plate or head.

The cover plate or head 25 is secured closely against the outer end of the cylinder section 1 and against the outer surface of a flange 37 projecting outwardly and laterally therefrom by means of bolts 38 and nuts 39 which extend through openings through the said flange 37 and through the plate or head 25 adjacent the outer edge thereof.

It will be observed that the cooling fluid, such as a liquid, which passes (in the operation as assumed) through the tubes 7 and 8 is discharged into the tubular member 20 and passes from the latter through an outlet conduit 40 which may convey the said fluid to any destination or point desired; and also that the probability of leakage and intermingling or mixing of the two counter-flowing fluids is reduced to a minimum.

It will be seen that by reason of the presence of the annular corrugations of the tubular member 20 it is capable of an accordion-like expansion and contraction so as to permit slidable movement of the tube sheet 10, its flange 15 and the washer-like member 30 with respect to the cylinder so as to allow for the linear expansion and contraction of the tubes 7 due to the varying temperature to which the said tubes may be subjected.

It will be seen that by my invention I have provided a construction of expansible joint adapted for the handling of a fluid, such as oil, at a relatively high temperature in an efficient manner. The construction is also adapted for handling such fluid or liquid at a lower temperature efficiently. It will also be seen that I have provided a construction in which the tightness or hermetic characteristic of a joint is not altered by variations in the temperature of the fluids which may be handled, and it will be seen further that I have provided a construction in which the leaking and mixing of the counter-flowing fluids are rendered practically impossible.

Having thus described my invention, what I claim and desire to secure by Letters Patent is:

1. In heat exchange apparatus, the combination of a cylinder, a plurality of tubes therein which extend longitudinally thereof, a movable tube sheet to which one end of each of said tubes is connected, said tube sheet being spaced from the closure of the adjacent end of said cylinder, and a longitudinally expansible conduit interposed between said tube sheet and said closure and having connection at its inner end with said tube sheet and at its outer end with the inner side of said closure.

2. In heat exchange apparatus, the combination of a cylinder, one end of which has a closure which is provided with an opening therethrough, a plurality of tubes situated in said cylinder, a movable tube sheet to which one end of each of said tubes is secured, a corrugated tubular section having connection at one end with said tube sheet and at its opposite end with the inner side of said closure, the said plurality of tubes being in communication with the said tubular section.

3. In a heat exchange apparatus, the combination of a cylinder, one end of which has a closure which is provided with an opening therethrough, a plurality of tubes situated in said cylinder, a movable tube sheet to which one end of each of said tubes is secured, said tube sheet being situated in spaced relation to the said closure, and the said tube sheet being provided with an outwardly extending flange, an expansible tubular section situated intermediate the said flange and the said closure, and means for connecting the said tubular section to said flange and to the inner side of said closure.

4. In heat exchange apparatus, the combination of a cylinder, one end of which has a closure which is provided with an opening therethrough, a plurality of tubes situated in said cylinder and extending longitudinally thereof, a movable tube sheet to which one end of each of said tubes is connected, said tube sheet fitting the interior of said cylinder and being located in spaced relation to said closure, a longitudinally expansible tubular member interposed between the said tube sheet and the said closure, said tubular member being provided with flanges at its opposite ends, and means for securing the said flanges to the said tube sheet and to the inner side of said closure.

5. In heat exchange apparatus, the combination of a cylinder, one end of which has a closure which is provided with an opening therethrough, a plurality of tubes situated within said cylinder and extending longitudinally thereof, a movable tube sheet to which one end of each of said tubes is secured, and a tubular member interposed between the said tube sheet and the said closure the inner end of which is connected to the said tube sheet and the outer end of which is connected to the inner side of said closure, the walls of said tubular member being provided with transversely extending annular bends therein.

6. In heat exchange apparatus, the combination of a cylinder, one end of which has a closure which is provided with an opening therethrough, a plurality of tubes, a movable tube sheet situated in said cylinder in spaced relation to said closure, one end of each of said tubes being connected to said tube sheet and the said tube sheet being provided with an outwardly extending flange situated within and closely fitting the said cylinder, a tubular member interposed between the said tube sheet and the said closure, said tubular member being provided with annular corrugations therein and being also provided with outwardly extending flanges at its opposite ends, one of which is seated against the outer edge of the flange of said tube sheet and the other of which is seated against the inner side of the said closure, holding rings seated upon the flanges of said tubular member, and means for clamping and holding the said holding rings against said flanges.

7. In heat exchange apparatus comprising an exterior casing, the combination of a movable tube sheet within and fitting said casing and a tubular member having connection at one end to the outer edge portion of said sheet and at its opposite end to the adjacent end of said casing.

8. In heat exchange apparatus, the combination of a hollow cylinder, tubes therein, a movable tube sheet to which one end of each of said tubes is connected which tube sheet fits the interior of said cylinder, and a tubular section of relatively thin material interposed between said tube sheet and the adjacent end of said cylinder and having operative connection at one end with said tube sheet and at its opposite end with the inner side of the end plate of said cylinder.

In testimony that I claim the foregoing as my invention, I have hereunto signed my name this 31st day of August, 1923.

HENRY F. HEINEMAN.